(12) United States Patent
Chun et al.

(10) Patent No.: US 7,690,630 B2
(45) Date of Patent: Apr. 6, 2010

(54) LONG TRAVEL, HIGH FORCE COMBINATION SPRING

(75) Inventors: Victor L. Chun, Walton Hills, OH (US); Brian Lee Taylor, Medina, OH (US); Alexander B. Leibman, Strongsville, OH (US); Michael Hajjar, Strongsville, OH (US)

(73) Assignee: Danly IEM, LLC

( * ) Notice: Subject to any disclaimer, the term of this patent is extended or adjusted under 35 U.S.C. 154(b) by 0 days.

(21) Appl. No.: 12/026,127

(22) Filed: Feb. 5, 2008

(65) Prior Publication Data

US 2008/0116624 A1 May 22, 2008

Related U.S. Application Data

(62) Division of application No. 10/936,213, filed on Sep. 7, 2004, now Pat. No. 7,350,774.

(51) Int. Cl.
*F16F 13/00* (2006.01)
(52) U.S. Cl. .................. 267/289; 267/169
(58) Field of Classification Search .......... 267/289, 267/291, 179, 169, 4; 72/434
See application file for complete search history.

(56) References Cited

U.S. PATENT DOCUMENTS

| | | | |
|---|---|---|---|
| 48,084 A | 6/1865 | Murray | |
| 932,489 A | 8/1909 | Murrey | |
| 1,895,840 A * | 1/1933 | Stone | 56/306 |
| 1,931,183 A * | 10/1933 | Drenning | 267/4 |
| 2,437,631 A | 3/1948 | Wood | |
| 2,688,884 A | 9/1954 | Warmoes et al. | |
| 3,556,504 A | 1/1971 | Sinclair | |
| 3,559,976 A | 2/1971 | Jerz, Jr. | |
| 3,603,610 A | 9/1971 | Thompson | |
| 3,814,524 A | 6/1974 | Sperti | |
| 3,862,751 A | 1/1975 | Schwaller | |
| 4,033,542 A | 7/1977 | Moehle et al. | |
| 4,521,002 A * | 6/1985 | Adorjan et al. | 267/221 |
| 4,905,574 A | 3/1990 | Trevisan | |
| 5,263,695 A | 11/1993 | Bianchi | |
| 5,390,903 A | 2/1995 | Fidziukiewicz | |

FOREIGN PATENT DOCUMENTS

DE 738791 9/1943

(Continued)

OTHER PUBLICATIONS

International Search Report for PCT Patent Application No. PCT/US06/31389, Apr. 4, 2006.

(Continued)

*Primary Examiner*—Bradley T King
(74) *Attorney, Agent, or Firm*—Schnader Harrison Segal & Lewis, LLP

(57) ABSTRACT

A long travel, varying spring rate combination spring includes two differing rate springs connected end-to-end in such a way that the lower rate spring is compressed until positive engagement of a plunger with an intermediate flange member occurs with the higher rate spring thereafter compressed. Each spring may be assembled separately and connected together with a coupling to create a combination spring, allowing various springs to be combined to meet the requirements of a particular application.

5 Claims, 5 Drawing Sheets

FOREIGN PATENT DOCUMENTS

| | | |
|---|---|---|
| DE | 10244379 A1 | 4/2004 |
| JP | 5683633 | 7/1981 |
| JP | 11028921 A * | 2/1999 |

OTHER PUBLICATIONS

Written Opinion dated Apr. 24, 2006 for PCT Patent Application No. PCT/US05/31389.
International Preliminary Report on Patentability dated May 24, 2007 for PCT Patent Application No. PCT/US05/31389.
Amendment and Response to May 11, 2007 Advisory Office Action for U.S. Appl. No. 10/936,213 dated Jul. 27, 2007.
Amendment and Response to May 11, 2007 Advisory Office Action for U.S. Appl. No. 10/936,213 dated Sep. 11, 2007.
Advisory Action dated May 11, 2007 for U.S. Appl. No. 10/936,213.
Amendment and Response to Dec. 29, 2006 Office Action for U.S. Appl. No. 10/936,213.
Office Action dated Dec. 29, 2006 for U.S. Appl. No. 10/936,213.
Supplemental Response to the Jun. 27, 2006 Amendment and Response to the Jan. 30, 2006 Office Action for U.S. Appl. No. 10/936,213.
Amendment and Response to the Jan. 30, 2006 Office Action for U.S. Appl. No. 10/936,213.
Office Action dated Jan. 30, 2006 for U.S. Appl. No. 10/936,213.
Office Action dated Nov. 2, 2005 for U.S. Appl. No. 10/936,213.
Election dated Nov. 9, 2005 for U.S. Appl. No. 10/936,213.
Translation of Office Action dated Jun. 27, 2008 for Chinese Patent Application No. 200580030040.X and Office Action.
Advisory Action dated Jul. 12, 2007 for U.S. Appl. No. 10/936,213.
Notice of Allowance dated Nov. 23, 2007 for U.S. Appl. No. 10/936,213.
European Search Report dated Jul. 22, 2009 for PCT Patent Application No. PCT/US2005/031389.
Written Opinion dated Apr. 24, 2006 for PCT Patent Application No. PCT/U52005/031389.

* cited by examiner

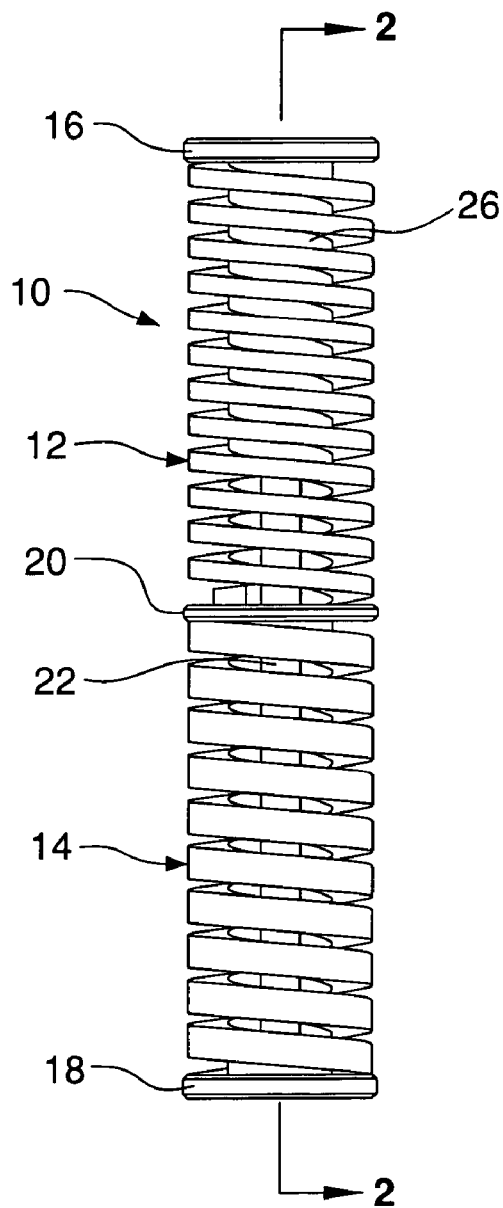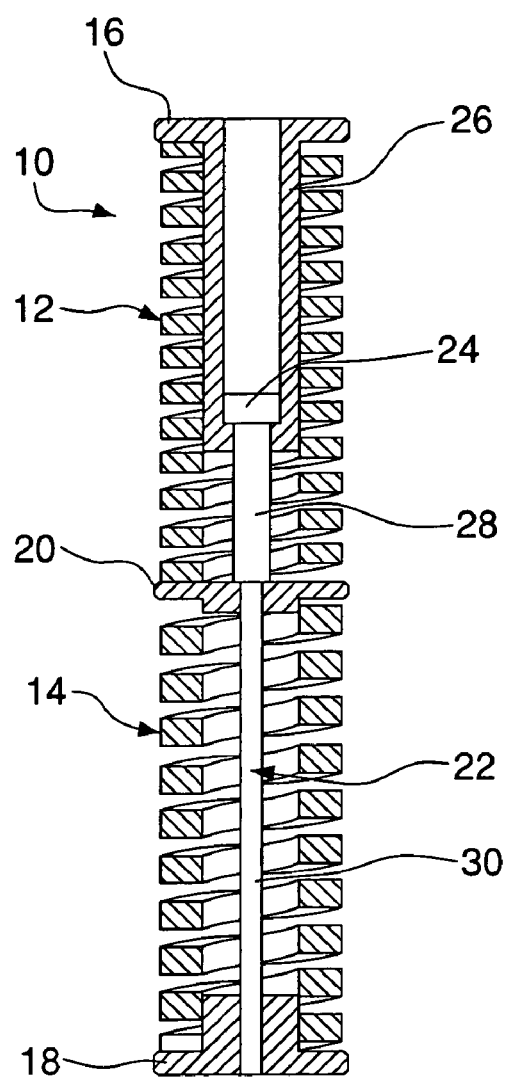
FIG. 1
FIG. 2

LONG TRAVEL, HIGH FORCE COMBINATION SPRING

This application is a divisional of and claims priority to application having Ser. No. 10/936,213, and a filing date of Sep. 7, 2004 entitled Long Travel, High Force Combination Spring.

BACKGROUND OF THE INVENTION

This invention concerns springs and more particularly mechanical compression springs as are used to provide a return force such as in cam operated dies.

In cam operated tooling installed on dies in forming presses, a slide is operated by the press motion to drive a tool used to form a feature on a part.

One or more return springs are compressed as the tool is advanced by a camming action produced by the slide. When the press platens are moved apart, the compressed spring or springs act to retract the slide.

In metal forming, it sometimes takes considerable force to withdraw a piercing tool from the part, such that a high return spring force is required at the start of the return motion. At the same time, a substantial slide travel is required. Very stiff coil springs have limited available travel for a given space due to the thick cross section required to develop a high spring rate.

This required combination of long travel and high peak forces has led to the development and use of "nitrogen" springs in which compressed nitrogen is sealed in a chamber, and further compressed by a piston having a projecting rod subjected to a load, creating a fluid spring.

Nitrogen springs are capable of generating considerable forces while allowing substantial travel, and are widely used as return springs in die cam units.

However, nitrogen springs have several disadvantages, including their initial high cost and their need to be serviced regularly, and the fact that high cycle rates are not possible due to excessive heat build up.

These nitrogen springs must be precharged with nitrogen under high pressure so as to have an initial high spring rate.

This initial high spring rate creates a high shock force when the cam unit is impacted by the cam driver since there is a relatively high initial resistance to cam movement caused by the precharging of the nitrogen spring.

These disadvantages of nitrogen springs led to the development of a variable force spring assembly described in U.S. Pat. No. 5,390,903, assigned to the predecessor company of the assignee of the present application.

The design disclosed in U.S. Pat. No. 5,390,903 houses springs of different stiffness in telescoped casings which are arranged to successively compress the springs, which are nested together, allowing a large range of movement with low forces developed initially and very high forces developed at the end of the stroke. A stack of Belleville springs is used as the high rate spring.

The inclusion of machined casings and other components makes that device relatively high in cost to manufacture, and is not easily adapted to varying applications since the casings and other components must be reengineered for each application. Also, the Belleville springs used are not well suited for high cycling rates, as fatigue failure commonly occurs when Belleville springs are subjected to such service.

For this reason, there has heretofore not been any mechanical spring arrangement available which has become commercially successful as a replacement for nitrogen springs.

Thus there is a need for a mechanical spring combination having a large travel, with an initial low spring rate during an initial range of compression and developing a high spring force through second shorter range of compression of the spring combination.

SUMMARY OF THE INVENTION

A plunger is slidable within the lower rate spring as the lower rate spring is compressed by a flange on the upper end of the plunger. The plunger in turn is slidable on a pin projecting from the other end of the combination spring through the higher rate spring and into the plunger. The pin has a first flange affixed thereto abutting the lower end of the high rate spring and an intermediate flange above the higher rate spring is held against the other end of the higher rate spring by being seated on a shoulder on the pin.

The plunger moves into abutment with the second flange held against the upper end of the higher rate spring after a predetermined length of travel, and thereafter begins to compress only the higher rate spring for the remainder of its stroke.

The higher spring rate spring is normally preloaded by the second flange to a degree such that it is not deflected by the pressure exerted by the lower rate spring and is not further compressed, until the plunger engages the intermediate flange. Alternatively, the higher rate spring may be preloaded to a lesser extent such as to be allowed to be deflected at the same time as the lower rate spring after the precompression level of the higher spring rate is reached when a composite spring rate is affected until abutment of the plunger against the intermediate flange occurs, and the only higher rate spring compressed thereafter.

In a second embodiment, separate spring assemblies each having a plunger, connecting pin, and precompression flanges are connected together end-to-end as by a press fit coupling pin mated with bores in adjacent flanges. This allows different combinations of various springs to be readily provided to suit different applications.

DESCRIPTION OF THE DRAWINGS

FIG. 1 is a side view of a combination spring according to the present invention.

FIG. 2 is a partially sectional view of the combination spring shown in FIG. 1.

DETAILED DESCRIPTION

Figure 3:
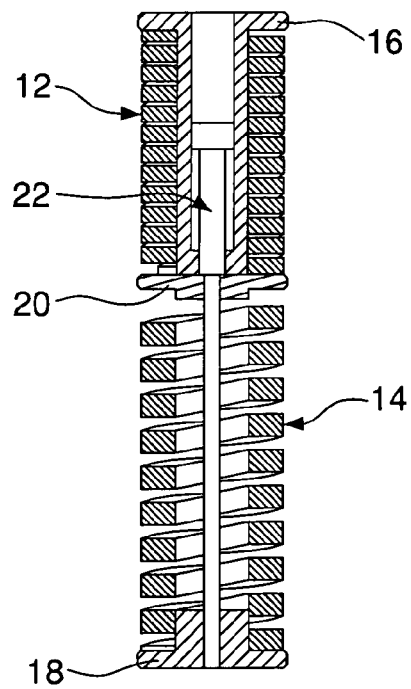
FIG. 3 is a partially sectional view of the combination spring shown in FIGS. 1 and 2 with the plunger within the lower rate spring moved into abutment with the upper flange to thereafter create compression of the higher rate spring by continued travel of the plunger.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, and particularly FIGS. 1-4, a combination spring 10 according to the present invention is shown, including two elongated, differing rate helically wound coil compression springs 12 and 14 connected together end-to-end.

Each spring 12, 14 is held compressed between respective end flanges 16, 18 and a common intermediate flange 20.

End flange 16 is held to the common intermediate flange 20 by a stepped diameter pin 22 having a head 24 slidable within a plunger 26 connected to the associated end flange 16.

The plunger 26 has an opening in its lower end slidably fit to a larger diameter section 28 of the pin 22, allowing the plunger 26 to slide down when the flange 16 is advanced to compress the lower rate spring 12 until moving into abutment with the upper surface of the intermediate flange 20.

The smallest diameter section 30 of the pin 22 extends through a hole in the intermediate flange 20 with a slidable fit, allowing the flange 20 to move down when compressing the higher rate spring 14.

The smallest diameter pin section 30 extends within the higher spring rate 14 to the end flange 18, to which it is affixed as by a plug weld. This prevents the intermediate flange 20 from moving away, which allows a precompression of the higher rate spring 14. The end flange 18 has a pilot plug 32 extending up into the lower end of the higher rate spring 14.

The combination spring 10 is mounted in an installation so that the two end flanges 16, 18 are able to be compressed together.

Different rate springs can be readily substituted into the combination to enable different spring requirements to be engineered at very low cost, and different end fittings easily provided as required for a given application.

In the first stage of compression, the lower rate spring 12 is compressed against the intermediate flange 20, held in position by the precompression of the higher spring rate spring 14. When the lower end of the plunger 26 contacts the intermediate flange 20, as seen in FIG. 3, after traveling a distance X, this positive abutment prevents further compression of the lower rate spring 12 and compression only of the higher rate spring 14 thereafter occurs with continued compression of the combination spring 10.

Figure 4:
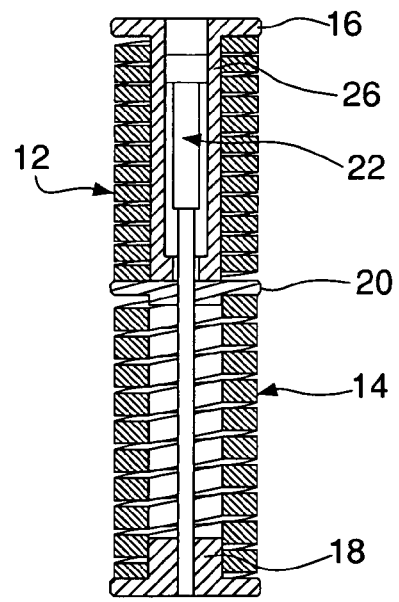
FIG. 4 is a partially sectional view of the combination spring shown in FIGS. 1-3 with both springs fully compressed.

The plunger 26 pushes the intermediate flange 20 off the shoulder on the stepped diameter pin 22 as seen in FIG. 4 to initiate compression of the higher rate spring 14.

Figure 9:
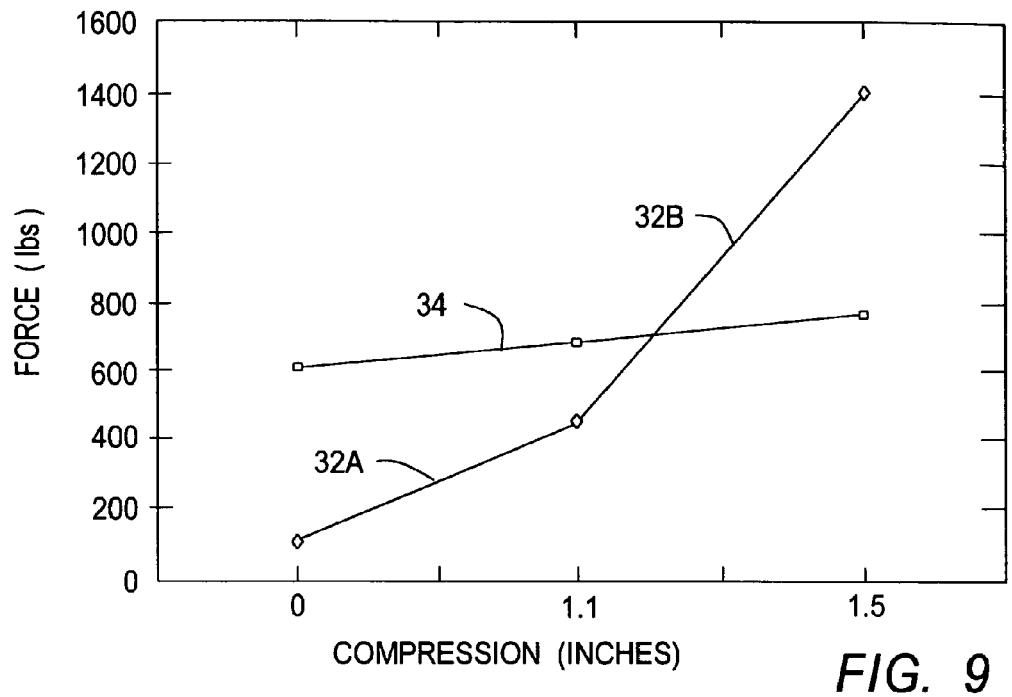
FIG. 9 is a diagram depicting the force-deflection characteristics of a typical combination spring according to the present invention and for comparison a characteristic of a conventional nitrogen spring.

FIG. 9 shows the force-deflection plot for the combination spring 10 of the present invention. If the precompression of the higher rate spring 14 is high enough to be in excess of the peak force existing at the point when compression of the lower rate spring 12 ceases, then two different segments 32A, 32B of the curve result.

Figure 10:
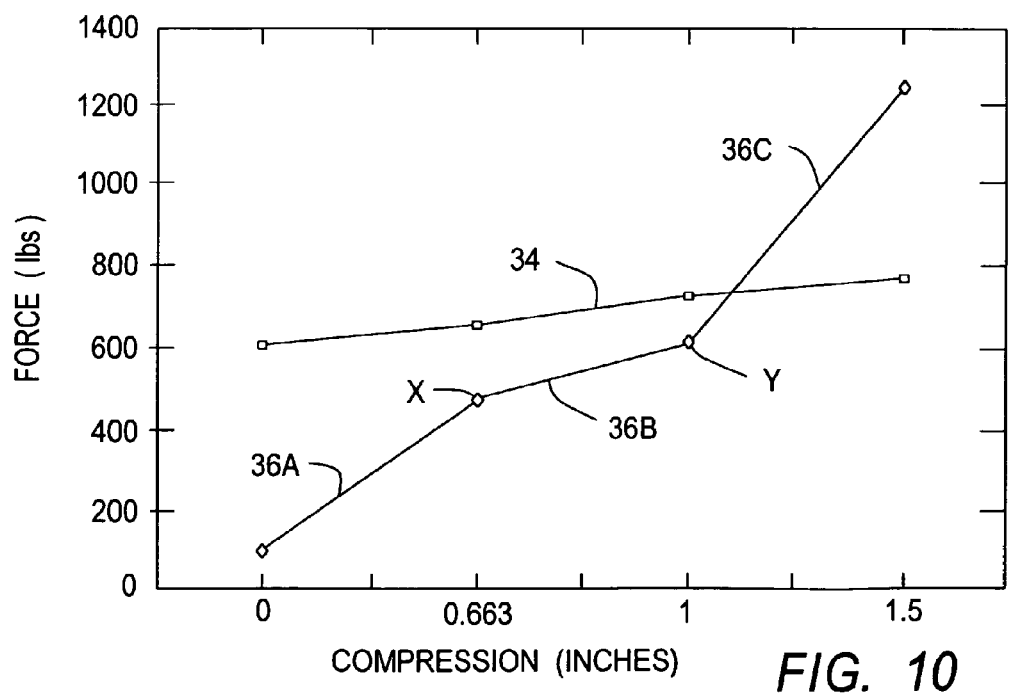
FIG. 10 is a diagram of another force-deflection curve for a spring combination creating three stages of effective spring rates.

A plot 34 of a conventional nitrogen spring is also shown for comparison. In FIG. 10, the initial compression of the lower rate spring 12 is plotted in segment 36A.

If the precompression of the high rate spring 14 is set to be less than in the above example such that the force in the lower rate spring 12 exceeds the higher rate spring force at some point during the compression of the lower rate spring 12, deflection of the higher rate spring will begin at point X as seen in FIG. 10 with deflection of the lower rate spring 12 continuing at the same time.

Thus, lesser composite spring rate exists from point X to point Y depicted as segment 36B. Abutment of the plunger 26 occurs at point Y.

Thereafter, the higher spring rate of the spring 14 alone controls, depicted by segment 36C.

Figure 5:
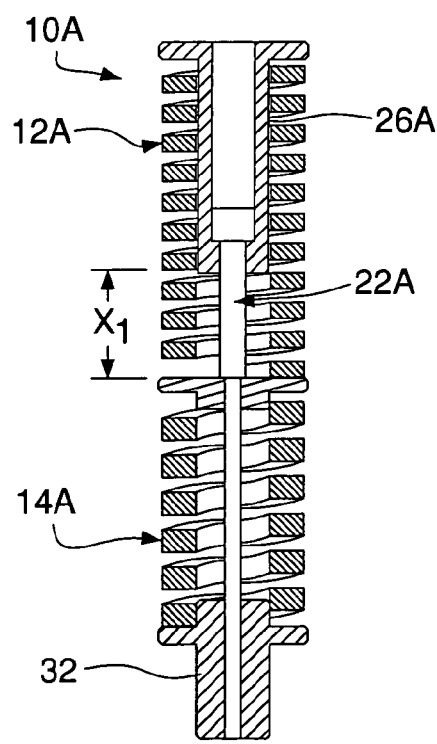
FIG. 5 is a partially sectional view of a variation of the combination spring shown in FIGS. 1-4.

The combination spring 10 can be easily redesigned for other applications, by merely changing the dimensions of the relatively simple hardware items, i.e., the plunger 26, the pin 22A, and substituting different springs 12A, 14A as in the combination spring 10A shown in FIG. 5.

A different plunger travel distance X, can also easily be set. A slight clearance between intermediate flange member 20 and second spring 12 to eliminate any precompression of the lower rate spring 12 may be provided, if desired.

Different end features can be included, as the pilot end feature 32 shown in FIG. 5.

Figure 6:
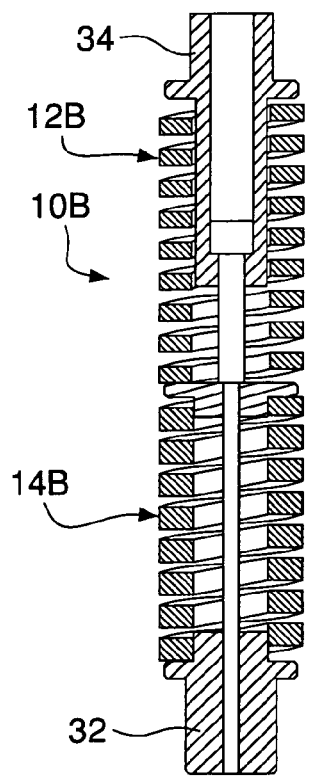
FIG. 6 is a partially sectional view of another variation of the combination spring shown in FIGS. 1-4.

Such a pilot feature 32 can be provided at one end and a tubular extension 34 at the other end in the combination spring 10B shown in FIG. 6.

Figure 7:
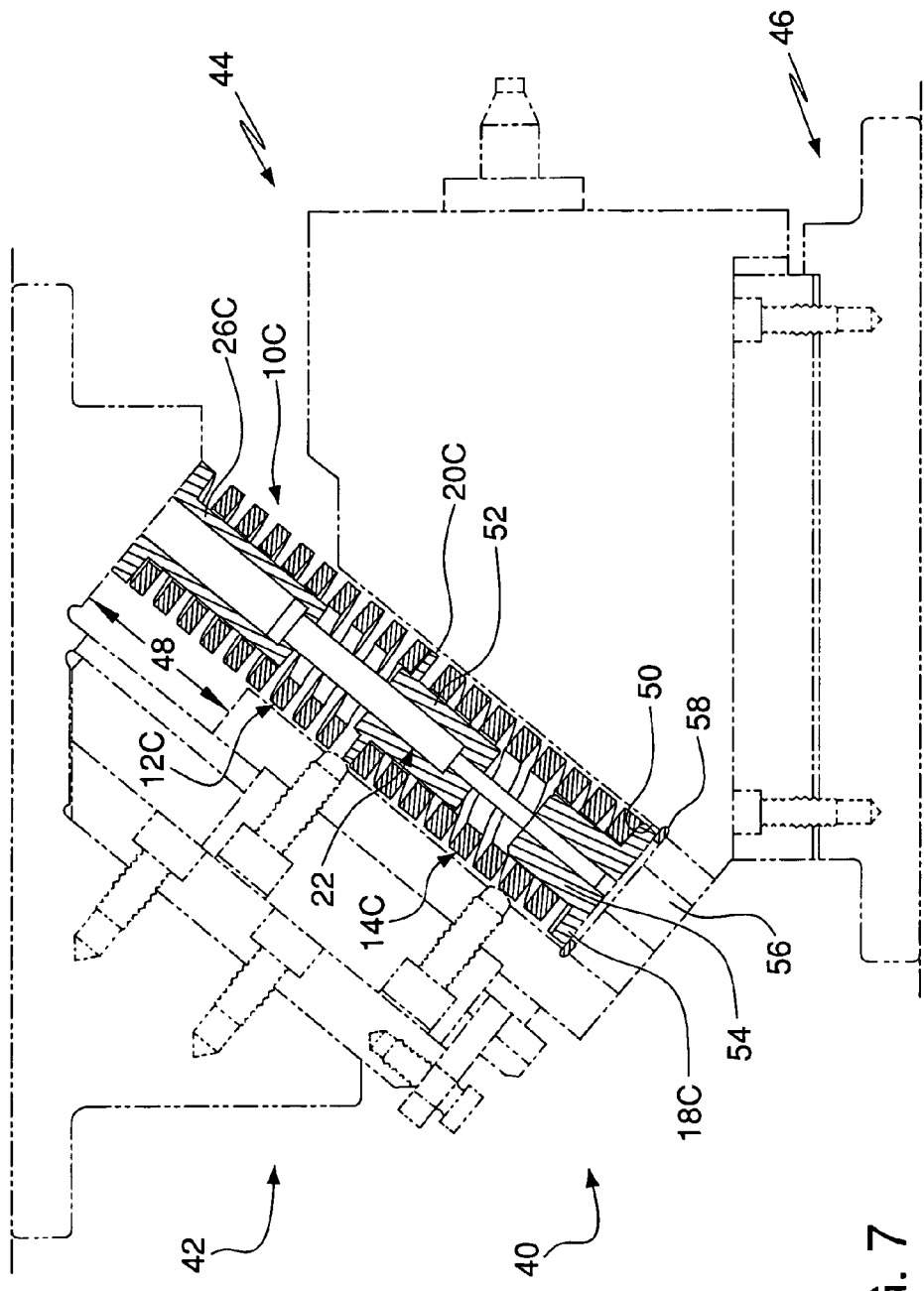
FIG. 7 is a partially sectional view of a die assembly having a combination spring according to the present invention installed therein.

FIG. 7 shows another variation of the combination spring 10C according to the invention installed in a cam unit 40 adapted to be installed in a press (not shown). Such cam units 40 include a driver 42 on an upper press platen which cams a tooling body 44 slidable on a plate 46 mounted on a lower press platen in the manner well known in the art.

The body 44 moves relative the driver 42 as the press is operated closing the space 45.

A return stripping force is created by a combination spring 10C installed in a pocket 50 formed in the tooling body 44 extending in the direction of relative movement between the driver 42 and body 44 so that this relative motion will compress the combination spring 10C.

The combination spring 10C includes a boss 52 integral with the intermediate flange 20C extending within the high rate spring 14C, and a boss 54 integral with the end flange 18 also extending within the high rate spring 14C.

The combination spring 10C is largely confined and supported within the bore 50. The protruding portion of the low rate spring 12C is internally supported by the plunger 26C, to eliminate any tendency to buckle.

A removable plug 56 is threaded into the lower end of the bore 50 and together with a snap ring 58, resists the force exerted when the combination spring 10C is fully compressed.

Other arrangements for providing a removable closure for the bore 50 are described in copending application U.S. Ser. No. 10/954,960, filed on Sep. 29, 2004.

Figure 8:
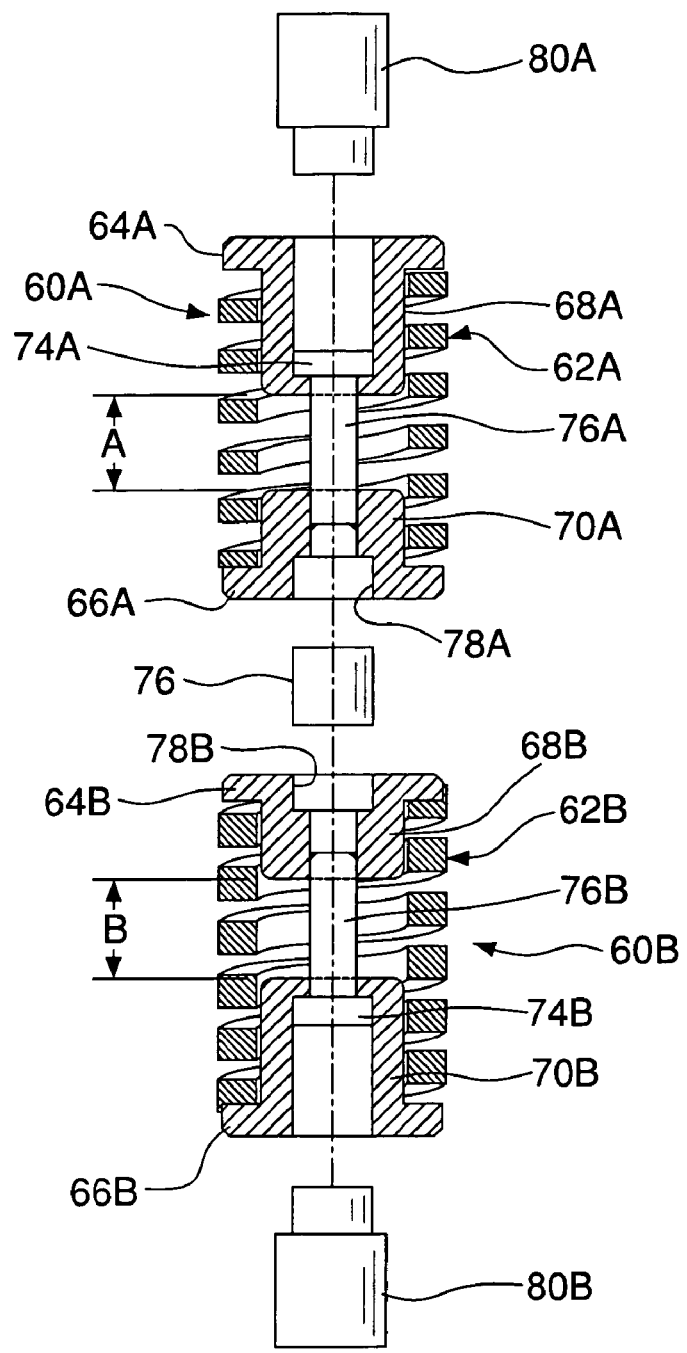
FIG. 8 is an exploded view in partial section of a second embodiment of a combination spring according to the present invention.

Referring to FIG. 8, two separate single spring assemblies 60A, 60B are shown which are readily connectable together to form a combination spring according to the invention.

This allows a wide variety of spring combinations to be conveniently made.

In this arrangement, each assembly 60A, 60B holds a respective compression coil spring 62A, 62B between a pair of end flanges 64A, 66A and 64B, 66B.

Each flange 64A, 64B, 66A, 66B has an integral boss 68A, 70A, 68B, 70B projecting into the associated spring 62A or 62B.

A headed pin is received in a bore in each boss 68A, 68B, 70A, 70B, the head portion 74A, 74B of the headed pin slidable in the outboard boss 70A, 70B. The stem portion 76A, 76B of the headed pin is plug welded in the opposite boss 70A, 68B. This captures the springs 62A, 62B between the associated pairs of flanges 64A, 66A and 64B, 66B.

Thus, the outside, end flanges 64A, 64B are free to collapse to compress the springs 62A, 62B respectively to the distance allowed by the spacing A, B.

Each spring assembly 60A, 60B is readily connectable by a coupling pin 76 press fit into counterbores 78A, 78B in adjacent flanges 66A, 64B.

Thus, various spring assemblies can be inventoried and combined in any combination suited to a particular application.

Optional pilots 80A, 80B can be press fitted in the bases of the opposite flanges 64A and 66B.

Urethane or other compression springs can be substantial for the coil springs shown, although the coil springs are preferred.

The invention claimed is:

1. A long travel, high force combination spring comprising:
    a first spring assembly having:
        a first spring;
        a first headed pin disposed within the first spring;
        a first end flange member slidably disposed around the first headed pin and having a boss projecting within the first spring at a first end of the first spring forming a plunger to compress the first spring, the head of the first headed pin positioned to stop the removal of the first end flange member from the spring;
    a second assembly arranged coaxially with the first spring assembly, the second spring assembly having:
        a second spring;
        a second headed pin disposed within the second spring;
        a second end flange member slidably disposed around the second headed pin and having a boss projecting within the second spring at a first end of the second spring forming a plunger to compress the second spring, the head of the second headed pin positioned to stop to the removal of the second end flange member from the spring;
        an intermediate flange member having a first end and a second end opposite to the intermediate flange member first end, the intermediate flange member disposed between the first spring assembly and the second spring assembly such that the intermediate flange member first end is engaged with a second end of the first spring and the intermediate flange member second end is engaged with a second end of the second spring;
    the intermediate flange member having a first intermediate flange part and a second intermediate flange part, removably connected to one another, the first intermediate flange part secured to the first headed pin and the second intermediate flange part secured to the second headed pin;
        the first spring assembly having the first intermediate flange part disposed opposed to the first end flange member, with the first intermediate flange part projecting within the first spring; and
        the second spring assembly having the second intermediate flange part disposed opposed to the second end flange member, the second intermediate flange part projecting within the second spring.

2. A method of making a combination spring comprised of two different rate springs comprising:
    assembling a first spring assembly having:
        a first spring;
        a first headed pin disposed within the first spring; and
        a first end flange member slidably disposed around the first headed pin and having a boss projecting within the first spring from a first end of the first spring forming a plunger to compress the first spring, the head of the first headed pin positioned to stop to the removal of the first end flange member from the spring;
    assembling a second spring assembly having:
        a second spring;
        a second headed pin disposed within the second spring; and
        a second end flange member slidably disposed around the second headed pin and projecting within the second spring from a first end of the second spring to act as a plunger to compress the second spring, the head of the second headed pin positioned to stop the removal of the second end flange member from the spring;
    arranging the second spring assembly coaxially with the first spring assembly with an intermediate flange member therebetween, the intermediate flange member having a first end and a second end opposite to the intermediate flange member first end, so that the second end of the first spring is engaged with the first end of the intermediate flange member and the second end of the second spring is engaged with the second end of the intermediate flange member;
    the intermediate flange member having a first intermediate flange part and a second intermediate flange part;
    securing the first intermediate flange part to the first headed pin such that the first intermediate flange part is opposed to the first end flange;
    securing the second intermediate flange part to the second headed pin such that the second intermediate flange part is opposed the second end flange; and
    connecting the first intermediate flange member to the second intermediate flange member.

3. The combination spring according to claim 1 wherein a coupling pin has opposite ends press fit into a bore in each of said intermediate flange member parts to form said combination spring.

4. The method according to claim 2 wherein at least one of said bosses is spaced from the associated intermediate flange member part to allow travel of said the associated end flange member to comprise a spring disposed therebetween and thereafter positively engage said associated intermediate flange member part.

5. The method according to claim 2 wherein said connected flange members are connected by press fitting each end of a coupling pin into a bore in each connected flange members.

* * * * *